8552X
J. Moore.
No Printed Specification Available
Straw Cutter.
No.
Patented Dec. 23, 1834.
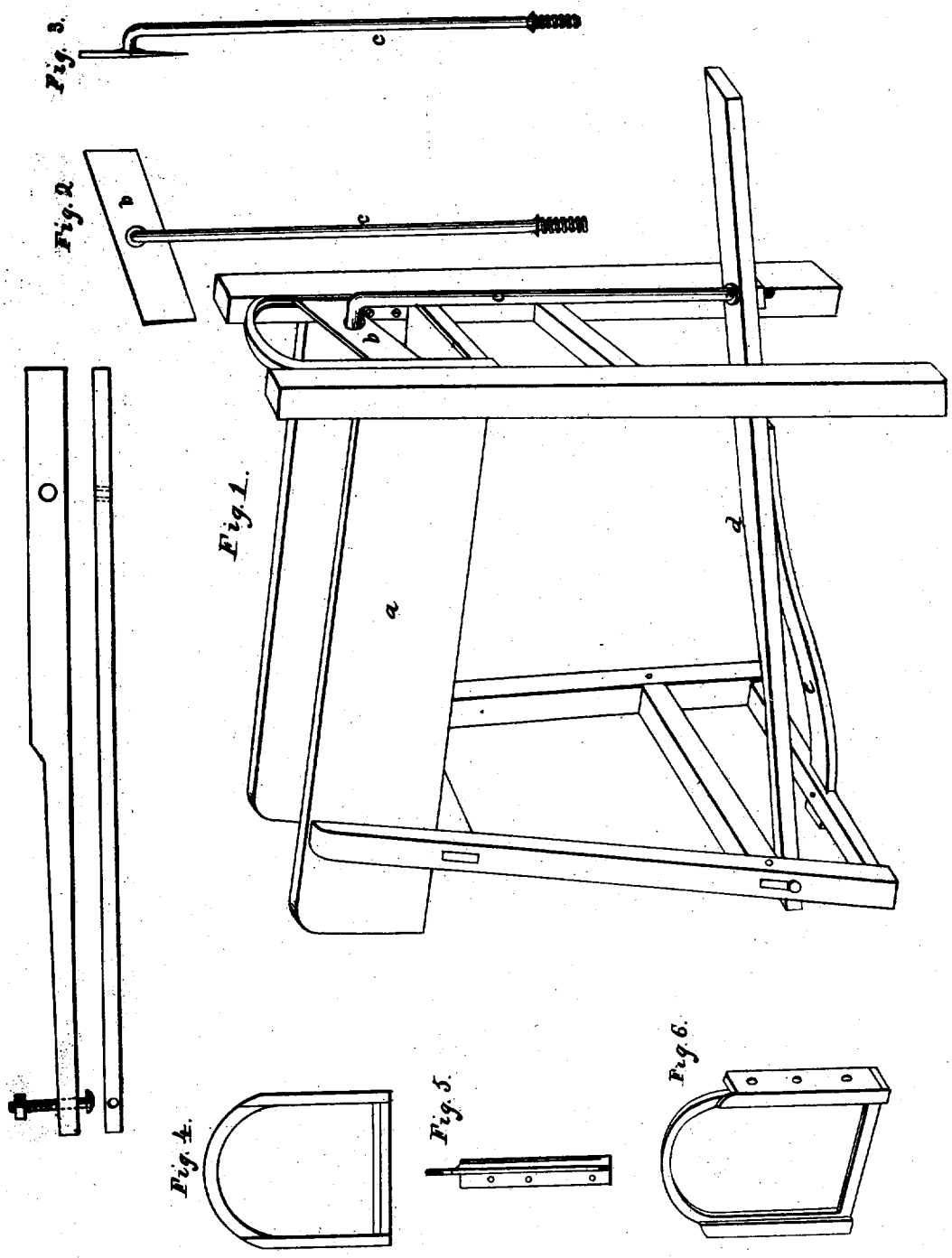

Joshua Moore, Roane Co. Tennessee

Letters Patent

The Schedule referred to in these Letters Patent and making part of the same containing a description in the words of the said Joshua Moore himself of his improvement in a machine for cutting straw To all whom these presents shall come Be it known that I Joshua Moore of the County of Roane in the State of Tennessee have invented a new machine or a new and useful improvement for cutting straw and that the following is a full and exact description of the construction and operation of the said machine as invented by me The Box is in the usual form for cutting Straw or Hay - The improvement is in having a short knife facing the front of the Box fastened to an upright Iron Bar which is attached to a treddle that works between the front feet of the Box and one end of the treddle is fastened to the left leg of the Box with a spring under it to raise it and the other end extending through the right leg The Box is faced with iron having in it a groove in which the knife plays Witnesses
J. Hinbaugh
Thomas Stockton Joshua Moore.

209 wds

Drawing 250 words

Ex
Ch